United States Patent
Sung et al.

(10) Patent No.: US 9,696,687 B2
(45) Date of Patent: Jul. 4, 2017

(54) COMPLEX SPATIAL LIGHT MODULATOR AND THREE-DIMENSIONAL IMAGE DISPLAY APPARATUS HAVING THE SAME

(71) Applicant: SAMSUNG ELECTRONICS CO., LTD., Suwon-si (KR)

(72) Inventors: Geeyoung Sung, Daegu (KR); Hoon Song, Yongin-si (KR); Jungkwuen An, Cheonan-si (KR); Kanghee Won, Seoul (KR); Hongseok Lee, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/561,760

(22) Filed: Dec. 5, 2014

(65) Prior Publication Data

US 2015/0160614 A1    Jun. 11, 2015

(30) Foreign Application Priority Data

Dec. 6, 2013  (KR) ........................ 10-2013-0151433

(51) Int. Cl.
*G03H 1/22* (2006.01)
*G02B 27/22* (2006.01)
*G02B 5/32* (2006.01)
*G02B 5/04* (2006.01)
*G03H 1/02* (2006.01)

(52) U.S. Cl.
CPC ....... *G03H 1/2294* (2013.01); *G02B 27/2214* (2013.01); *G02B 27/2242* (2013.01); *G02B 5/045* (2013.01); *G02B 5/32* (2013.01); *G02B 27/2264* (2013.01); *G03H 2001/0224* (2013.01); *G03H 2223/18* (2013.01); *G03H 2223/19* (2013.01); *G03H 2225/33* (2013.01); *G03H 2225/55* (2013.01)

(58) Field of Classification Search
CPC .. G02B 6/0038; G02B 6/0053; G02B 6/0036; G02B 6/0061; G02B 21/14; G03H 1/08; G03H 1/2294; G03H 1/22; F21S 48/1233; F21S 5/00; F21S 2101/02; H04N 9/3197
See application file for complete search history.

(56) References Cited

U.S. PATENT DOCUMENTS

| | | |
|---|---|---|
| 5,877,873 A | 3/1999 | Bashaw et al. |
| 6,879,426 B1 | 4/2005 | Weiner |
| 7,128,420 B2 | 10/2006 | Kapellner et al. |

(Continued)

OTHER PUBLICATIONS

US 8,466,945, 06/2013, Sandstrom (withdrawn)

*Primary Examiner* — Jennifer L. Doak
(74) *Attorney, Agent, or Firm* — Sughrue Mion, PLLC

(57) ABSTRACT

Provided are a complex spatial light modulator and a three-dimensional (3D) image display apparatus. The complex spatial light modulator includes a spatial light modulator configured to modulate a phase of light, a first prism array which is disposed after the spatial light modulator along a path of the light, and including prism units each having a first prism surface and a second prism surface, and a hologram optical device configured to diffract the light that has passed through the first prism array independently from a polarization of the light, where the first prism array and the hologram optical device are configured to modulate the phase and an amplitude of the light.

22 Claims, 10 Drawing Sheets

(56) References Cited

U.S. PATENT DOCUMENTS

2012/0092735 A1    4/2012  Futterer et al.
2014/0210960 A1*   7/2014  Sung ................ G02F 1/133504
                                                        348/51
2014/0300709 A1*  10/2014  Futterer ............... G03H 1/2286
                                                        348/51

* cited by examiner

COMPLEX SPATIAL LIGHT MODULATOR AND THREE-DIMENSIONAL IMAGE DISPLAY APPARATUS HAVING THE SAME

CROSS-REFERENCE TO RELATED APPLICATIONS

This application claims the benefit of Korean Patent Application No. 10-2013-0151433, filed on Dec. 6, 2013, in the Korean Intellectual Property Office, the disclosure of which is incorporated herein in its entirety by reference.

BACKGROUND

1. Field

The exemplary embodiments relate to complex spatial light modulators for modulating both a phase and an amplitude, and three-dimensional (3D) image display apparatuses having the same.

2. Description of the Related Art

Recently, three-dimensional (3D) movies are increasingly being produced, and accordingly, a lot of research for technology regarding 3D image display apparatuses is being performed. A 3D image display apparatus displays a 3D image based on binocular parallax between two eyes. Thus, based on binocular parallax, a 3D image display apparatus that is currently commercialized provides an image for a left eye and an image for a right eye, which have different points of view, respectively, to a left eye and a right eye of a viewer, so that the viewer may feel a 3D effect. Such a 3D image display apparatus includes a glasses-type 3D image display apparatus that needs special glasses and a non-glasses type 3D image display apparatus that does not need special glasses.

However, when viewing a 3D image that is shown by using a binocular parallax method, the eyes of a viewer may feel very tired. Additionally, since a 3D image display apparatus, which provides only two points of view for an image for a left eye and an image for a right eye, may not reflect a change in a point of view according to moving of a viewer, there is a limit to providing a natural 3D effect.

Research for a holographic 3D image display apparatus is being performed so as to develop a way to display a natural 3D image. However, a device for controlling a phase of light, as well as amplitude of light, is necessary in order to implement a holographic 3D image display apparatus. If an image is displayed by using a device that may control only one of brightness (an amplitude) or a phase, image quality may be deteriorated due to zero-order diffraction light, twin images, or speckles.

SUMMARY

According to an exemplary embodiment, provided are complex spatial light modulators for modulating both a phase and an amplitude together and providing high light efficiency.

According to an exemplary embodiment, provided are holographic three-dimensional (3D) image display apparatuses for displaying a 3D image by using a complex spatial light modulator that may control amplitude and a phase together.

Additional aspects will be set forth in part in the description which follows and, in part, will be apparent from the description, or may be learned by practice of the presented exemplary embodiments.

According to an aspect of an exemplary embodiment, there is provided a complex spatial light modulator including a spatial light modulator configured to modulate a phase of light; a first prism array which is disposed after the spatial light modulator along a path of the light, and including prism units each having a first prism surface and a second prism surface; and a hologram optical device configured to diffract the light that has passed through the first prism array independently from a polarization of the light.

The first prism array and the hologram optical device may be configured to modulate the phase and an amplitude of the light.

The first prism surface and the second prism surface may respectively include a refraction surface configured to refract the light, and the first prism surface and the second prism surface may be arranged to be symmetric to each other.

The complex spatial light modulator may further include a second prism array disposed after the hologram optical device along the path of the light.

The second prism array may have a structure that is symmetric to the first prism array with respect to the hologram optical device.

The first prism surface may include a diffraction surface configured to diffract the light, and the second prism surface may include a transmission surface configured to transmit the light in a straight line.

The hologram optical device may include a plurality of hologram patterns that depend on a wavelength of incident light.

The complex spatial light modulator may be configured to modulate color light by using a time-division method or a spatial division method.

The first prism array may include a first prism unit, a second prism unit, and a third prism unit, and the first prism unit, the second prism unit, and each may have different prism angles from each other.

The spatial light modulator may include a plurality of pixels, and a prism unit which has a pitch that corresponds to two of the pixels.

The complex spatial light modulator may have light efficiency equal to or higher than 50% and equal to or less than 100%.

The complex spatial light modulator may include an electro-opto material having a refractive index configured to change according to an electrical signal.

According to another aspect of an exemplary embodiment, there is provided a three-dimensional (3D) image display apparatus including a light source configured to irradiate light; a spatial light modulator configured to modulate a phase of the light from the light source; an image signal circuit configured to input an image signal to the spatial light modulator; and a beam combiner (BC) configured to modulate a phase and an amplitude of the light after the light passes through the spatial light modulator.

The 3D image display apparatus may include a first prism array including prism units each having a first prism surface and a second prism surface, and a hologram optical device configured to diffract the light that has passed through the prism array independently from a polarization of the light.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
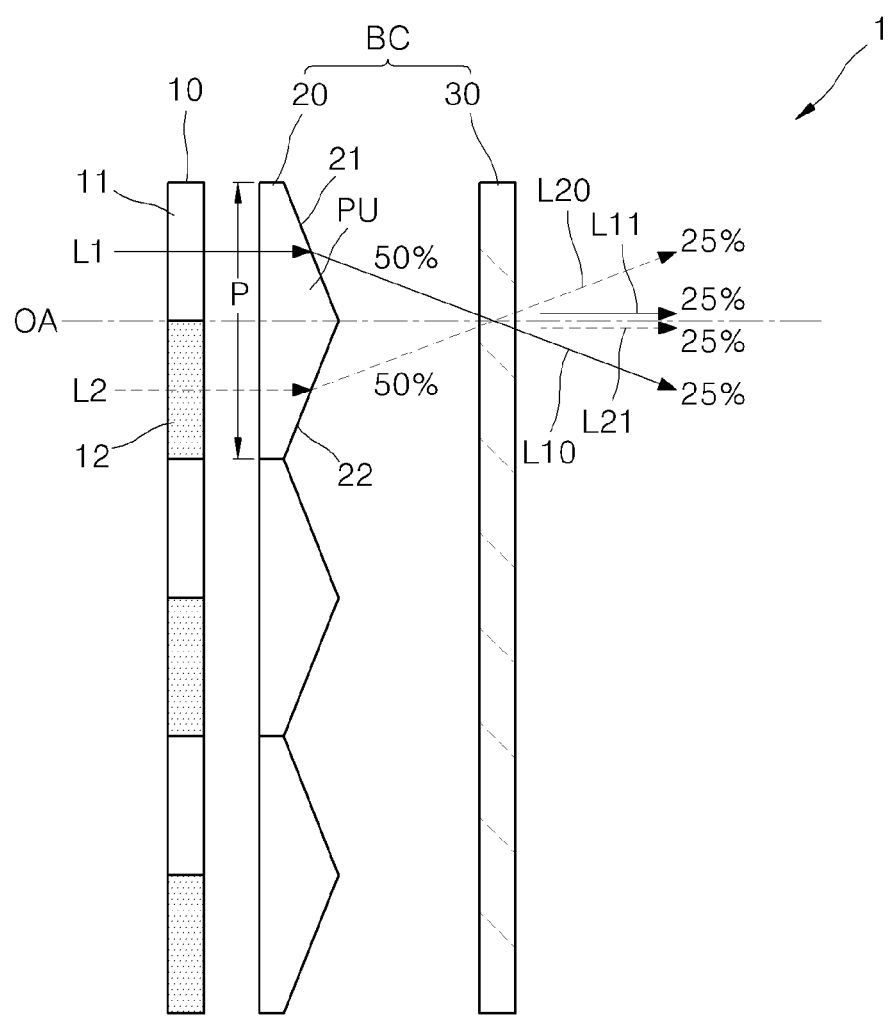
FIG. 1 is a diagram illustrating a complex spatial light modulator according to an exemplary embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description.

Hereinafter, according to exemplary embodiments, a complex light modulator and a three-dimensional image display apparatus including the same will be described in detail by explaining exemplary embodiments with reference to the attached drawings. In the drawings, the thicknesses of layers and regions are exaggerated for convenience of description. It will be understood that when an element or layer is referred to as being "on" another element or layer, the element or layer can be located in contact or in non-contact with another element or layer.

FIG. 1 is a schematic diagram illustrating a complex spatial light modulator 1 according to an exemplary embodiment. The complex spatial light modulator 1 may include a spatial light modulator 10 for modulating a phase of a beam, and a beam combiner BC for combining the beam that is transmitted from the spatial light modulator 10.

The spatial light modulator 10 may include an electro-optic material that may change a refractive index according to an electrical signal. The spatial light modulator 10 may include, for example, an electro-optic material layer such as a liquid-crystal layer. When a voltage is applied to the spatial light modulator 10, a refractive index of the spatial light modulator 10 is changed, and thus, the spatial light modulator 10 may control a phase of output light. For example, the spatial light modulator 10 may include a polymer-dispersed liquid-crystal layer. According to a voltage applied to the polymer-dispersed liquid-crystal layer, a length of an optical path may be changed, and accordingly, a phase of light may be modulated. According to characteristics of an electro-optic material layer, phase retardation may occur, and thus, a polarizing direction of light may be changed. Although not illustrated, a phase plate and a polarizing plate may be further included after the spatial light modulator 10 so as to compensate for a changed polarizing direction.

The beam combiner BC may include a first prism array 20 and a hologram optical device 30. The first prism array 20 may have a structure in which a plurality of prism units PU1 is arranged. The prism unit PU1 may include a first prism surface 21 and a second prism surface 22. The first prism surface 21 and the second prism 22 may respectively include a diffraction surface for diffracting light. In other words, the first prism surface 21 and the second prism surface 22 may have a diffraction surface that is inclined against an optical axis OA. The first prism surface 21 and the second prism surface 22 may be arranged to be symmetric to the optical axis OA or a central axis. The first prism surface 21 and the second prism surface 22 may have a same inclination (or a prism angle) against the optical axis OA.

The spatial light modulator 10 may include a plurality of pixels 11 and 12. The prism unit PU1 in the first prism array may have a pitch that corresponds to two pixels. The plurality of pixels of the spatial light modulator 10 may, for example, be arranged in the form of a two-dimensional (2D) matrix and include one prism unit in correspondence with pixels that are included in two lines. In this case, the first prism surface 21 may be included to correspond to pixels that are included in one line, and the second prism surface 22 to correspond to pixels that are included in a different line. Alternately, one prism unit may be included to correspond to pixels that are included in one line. Alternately, one prism unit may be included to correspond to two pixels.

A beam that passes through the prism array 20 is incident on the hologram optical device 30. The hologram optical device 30 may have a hologram pattern that may control a diffraction angle of light, according to an incident angle of incident light. For example, the hologram optical device 30 may diffract light, incident with a first angle, and transmit light, incident with a second angle instead of a first angle. The hologram optical device 30 may combine two beams of light, which are incident with different angles, on a same optical axis according to a hologram pattern written inside the hologram optical device 30. The hologram optical device 30 does not depend on polarization of light.

When a hologram pattern is written on the hologram optical device 30, if the spatial light modulator 10, the prism array 20, and the hologram optical device 30 are arranged and parallel light is applied to the hologram optical device 30, a hologram pattern may be written on the hologram optical device 30. If parallel light is applied to the hologram optical device 30 on which the hologram pattern is written, light may be automatically combined according to the hologram pattern. As such, since the hologram pattern may be written after the hologram optical device 30 is arranged, a problem of optical arrangement of the hologram optical device 30 may be solved. Additionally, since the hologram optical device 30 may improve efficiency of light diffraction, efficiency of using light that is combined through the hologram optical device 30 may be improved. The complex spatial light modulator 1 may have light efficiency equal to or higher than 50% and equal to or less than 100%.

Referring to FIG. 1, an operation of the complex spatial light modulator 1 is described. With regard to the spatial light modulator 10, the first pixel 11 and the second pixel 12 are constructed in a pair, and first light L1 that has passed through the first pixel 11 and second light L2 that has passed through the second pixel 12 are combined by the beam combiner BC, and thus, a phase and an amplitude of light may be modulated.

The first light L1 is incident on the first prism surface 21 of the prism array 20, and thus, diffracted with a first angle, and the second light L2 is incident on the second prism surface 22 of the prism array 20, and thus, diffracted with a second angle. The first light L1 and the second light L2 may be respectively incident on the hologram optical device 30, and partial light L10 of the first light L1 may be transmitted without diffraction, and remaining light L11 of the first light L1 may be diffracted. Additionally, partial light L20 of the second light L2 may be transmitted without diffraction, and remaining light L21 of the second light L2 may be diffracted.

With regard to light efficiency for light that is incident on the first pixel 11 and the second pixel 12, the first light L1, which has passed through the first prism surface 21, may have light efficiency of approximately 50%, and the second light L2, which has passed through the second prism surface 22, may have light efficiency of approximately 50%. Additionally, when the hologram optical device 30 is used, the transmitted light L10 of the first light L1 may have light efficiency of approximately 25%, and the diffracted light L11 of the first light L1 may have light efficiency of approximately 25%. Additionally, the transmitted light L20 of the second light L2 may have light efficiency of approximately 25%, and the diffracted light L21 of the second light L2 may have light efficiency of approximately 25%. Such light efficiency is an example that is calculated on an assumption of an ideal case in which there is no light loss. If diffraction efficiency becomes different according to a hologram pattern of the hologram optical device 30, light efficiency may become different.

Light that has passed through the hologram optical device 30, for example, the diffracted light L11 of the first light and the diffracted light L21 of the second light may be combined at the optical axis OA. Resultantly, the combined light may have light efficiency of approximately 50%. However, light efficiency is not limited thereto. As such, the first light and the second light may be combined by the hologram optical device 30, and thus, may become an interfering complex-valued modulated light wave. Thus, third light, having a phase and an amplitude which are modulated together, may be output.

For example, when the first light L1 has a first phase φ1 through the spatial light modulator 10, and the second L2 has a second phase φ2 through the spatial light modulator 10, if the first light and the second light are combined, a following equation may be satisfied.

$$\frac{1}{2}e^{i\phi_1(x,y)} + \frac{1}{2}e^{i\phi_2(x,y)} = \cos\left(\frac{\phi_1 - \phi_2}{2}\right)\exp\left[i\left(\frac{\phi_1 + \phi_2}{2}\right)\right] \quad \langle\text{Equation 1}\rangle$$

A cos term on a right side of Equation 1 represents a term relating to an amplitude, and an exp term represents a term relating to a phase. Equation 1 shows that when the first light L1 having the first phase φ1 and the second light L2 having the second phase φ2 are combined as a beam having one axis, a phase and an amplitude are modulated together.

In other words, a phase of light may be modulated by the spatial light modulator 10, and an amplitude and a phase of light may be modulated together by the beam combiner BC. As such, in the current exemplary embodiment, a phase and an amplitude may be modulated together, and thus, deterioration of image quality that may be caused by twin images or speckles may be prevented. Additionally, a spatial light modulator and a beam combiner BC may be arranged in parallel to each other, and thus, an optical arrangement may be facilitated. Additionally, since a spatial light modulator and a slim BC may be manufactured and disposed to be slim, a complex spatial light modulator may be slimmed down. Thus, a slimmed down complex spatial light modulator may be applied to a flat-panel display (FPD).

Figure 2:
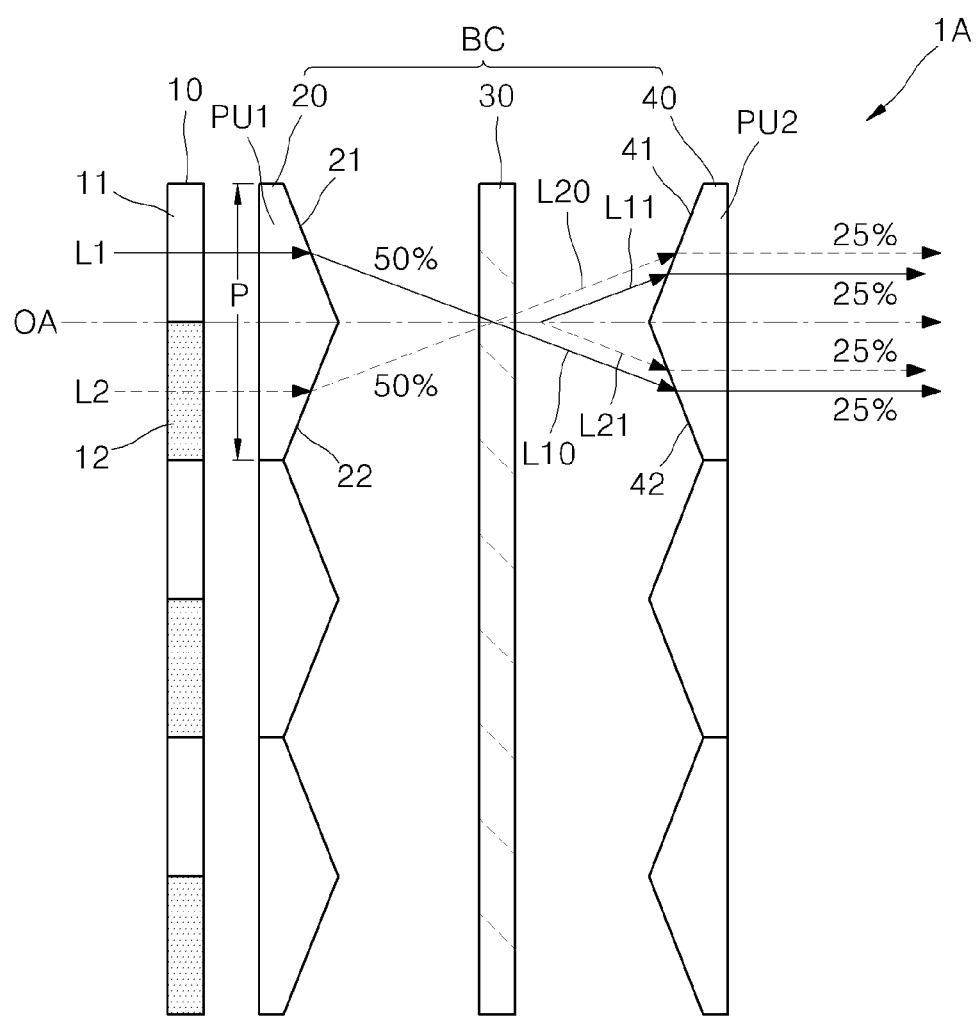
FIG. 2 illustrates an example in which a prism array is further included in the complex spatial light modulator of FIG. 1.

FIG. 2 illustrates an example in which a prism array is further included in the complex spatial light modulator of FIG. 1. A beam combiner BC included in the complex spatial light modulator 1A, shown in FIG. 2, may further include a second prism array 40, after the hologram optical device 30. The spatial light modulator 10, the first prism array 20, and the hologram optical device 30 are identical to those shown in FIG. 1. Thus, a detailed description thereof will not be provided again.

The second prism array 40 may have a structure in which a plurality of prism units PU2 is arranged. The prism unit PU2 may include a third prism surface 41 and a fourth prism surface 42. The third prism surface 41 and the fourth prism surface 42 may have a structure in which a plurality of prism units PU2 is arranged. The third prism surface 41 and the fourth prism surface 42 may respectively include a diffraction surface for diffracting light. In other words, the third prism surface 41 and the fourth prism surface 42 may have a diffraction surface that is inclined against the optical axis OA. The third prism surface 41 and the fourth prism surface 42 may be arranged to be symmetric to the optical axis OA. The third prism surface 41 and the fourth prism surface 42 may have a same inclination against the optical axis OA.

One prism unit PU2 may be included to correspond to pixels that are included in two lines of the spatial light modulator 10. In this case, the third prism surface 41 may be included to correspond to pixels that are included in one line, and the fourth prism surface 42 may be included to correspond to pixels that are included in a different line. Alternately, one prism unit PU2 may be included to correspond to pixels that are included in one line. Alternately, one prism unit PU2 may be included to correspond to two pixels.

The first prism array 20 and the second prism array 40 may have a same prism structure. Additionally, the first prism array 20 and the second prism array 40 may be disposed to be symmetric to each other with respect to the hologram optical device 30. In other words, the PU1 in the first prism array 20 and the PU2 in the second prism array 40 may be arranged to face each other. Alternately, the PU1 in the first prism array 20 and the PU2 in the second prism array 40 may be arranged in an opposite direction to each other.

An operation of the complex spatial light modulator 1A is described. Operations of the spatial light modulator 10, the first prism array 20, and the hologram optical device 30 are the same as those described with reference to FIG. 1. For example, the transmitted light L10 and the diffracted light L11 of the first light L1 and the transmitted light L20 and the diffracted light L21 of the second light L2, which have passed through the hologram optical device 30, are refracted by the second prism array 40, and thus, become light respectively parallel to the optical axis OA.

Accordingly, the transmitted light L10 and the diffracted light L11 of the first light L1 and the transmitted light L20 and the diffracted light L21 of the second light L2 may be used as effective light. In this case, for example, light efficiency may be approximately 100%. As such, light efficiency may be improved by the second prism array 40.

Figure 3:
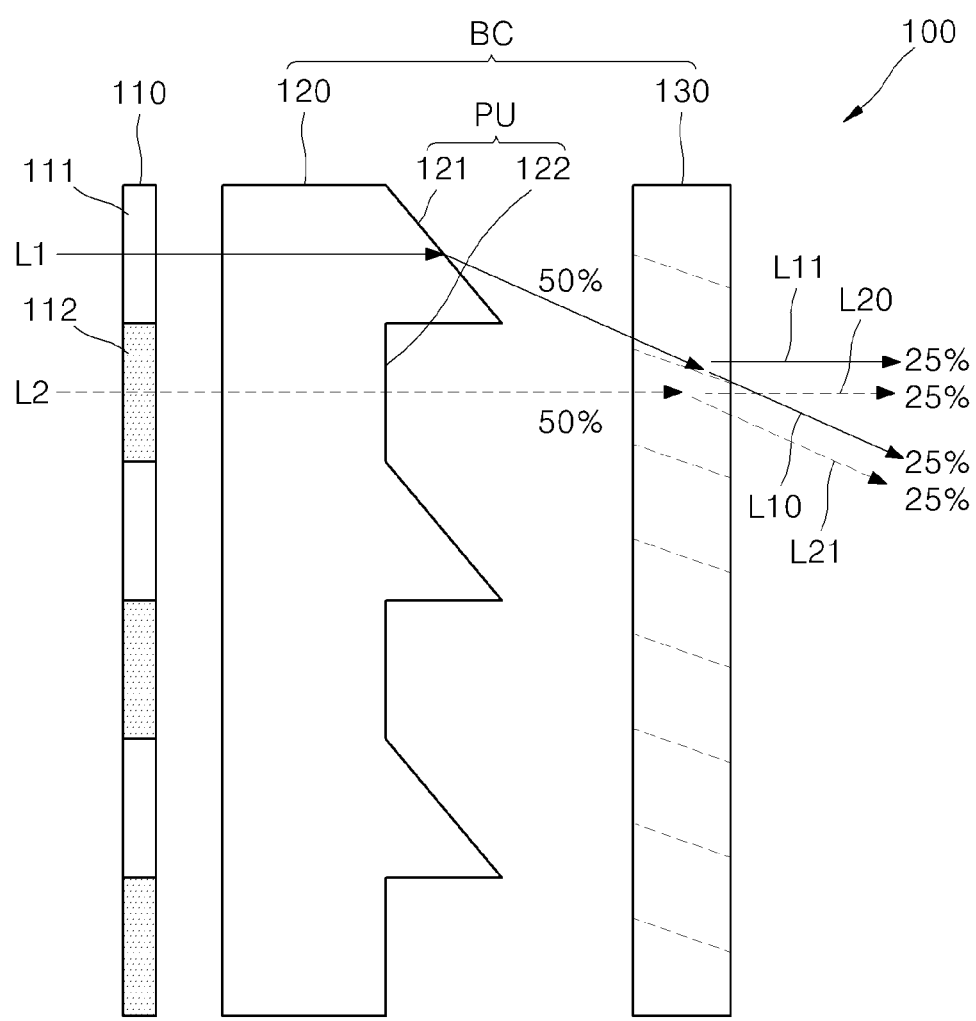
FIG. 3 illustrates a complex spatial light modulator according to another exemplary embodiment.

FIG. 3 illustrates a complex spatial light modulator 100 according to another exemplary embodiment. The complex spatial light modulator 100 may include a spatial light modulator 110 for modulating a phase of a beam, and a beam combiner BC for combining the beam that is transmitted from the spatial light modulator 10.

The beam combiner BC may include a prism array 120 and a hologram optical device 130. The spatial light modulator 110 and the hologram optical device 130 may substantially have the same structure and working effect as those of the spatial light modulator 10 and the hologram optical device 30. Thus, a detailed description thereof will not be provided again.

The prism array 120 includes a plurality of prism units PU. The prism unit PU may include a first prism surface 121 for diffracting incident light and a second prism surface 122 for transmitting incident light. For example, the first prism surface 121 may have an inclined surface, and the second prism surface 22 may have a surface perpendicular to the optical axis OA.

The spatial light modulator 110 may include a first pixel 111 and a second pixel 112. For example, the first prism surface 121 of the prism unit PU may be disposed to correspond to the first pixel 111 of the spatial light modulator 110, and the second prism surface 122 of the prism unit PU may be disposed to correspond to the second pixel 112 of the spatial light modulator 110. The prism unit PU may have a pitch that corresponds to two pixels of the spatial light modulator 110. With regard to the spatial light modulator 110, the first pixel 111 and the first pixel 112 form a pair, and the first light L1 that has passed through the first pixel 111 and the second light L2 that has passed through the second light 112 are combined by the beam combiner BC, and thus, a phase and an amplitude of light may be modulated together.

The first light L1 is incident on the first prism surface 121 of the prism array 121 and refracted with a certain angle, and the second light L2 may pass through the second prism surface in a straight line. The first light L1 and the second light L2 may be respectively incident on the hologram optical device 130, and partial light L10 of the first light L1 may be transmitted through the hologram optical device 130 without diffraction, and remaining light L11 of the first light L1 may be diffracted by the hologram optical device 130 without diffraction. Additionally, partial light L20 of the second light L2 may be transmitted through the hologram optical device 130 without diffraction, and remaining light L21 of the second light L2 may be diffracted by the hologram optical device 130.

For example, the diffracted light L11 of the first light L1 and the transmitted light L20 of the second light L2 may be combined on one optical axis, and thus, used as effective light.

With regard to light efficiency of light that is incident on the first pixel 111 and the second pixel 112, the first light L1, which has passed through the first prism surface 121, may have light efficiency of approximately 50%, and the second light L2, which has passed through the second prism surface 122, may have light efficiency of approximately 50%. Additionally, by using the hologram optical device 130, the transmitted light L10 of the second light L1 may have light efficiency of approximately 25%, and the diffracted light L11 of the second light L1 may have light efficiency of approximately 25%. Additionally, the transmitted light L20 of the second light L2 may have light efficiency of approximately 25%, and the diffracted light L21 of the second light L2 may have light efficiency of approximately 25%. If the diffracted light L11 of the first light L1 and the transmitted light L20 of the second light L2 are combined on one optical axis, and thus, used as effective light, light efficiency of approximately 50% may be obtained. However, light efficiency is not limited thereto, and may be adjusted according to a hologram pattern of a hologram optical device.

If the second light L2 passes through a prism array, it may be relatively easy to control light when the second light L2 is transmitted in a straight line rather than refracted. Accordingly, the second prism surface 122 of the prism array may be formed as a surface that is perpendicular to an optical axis.

Figure 4:
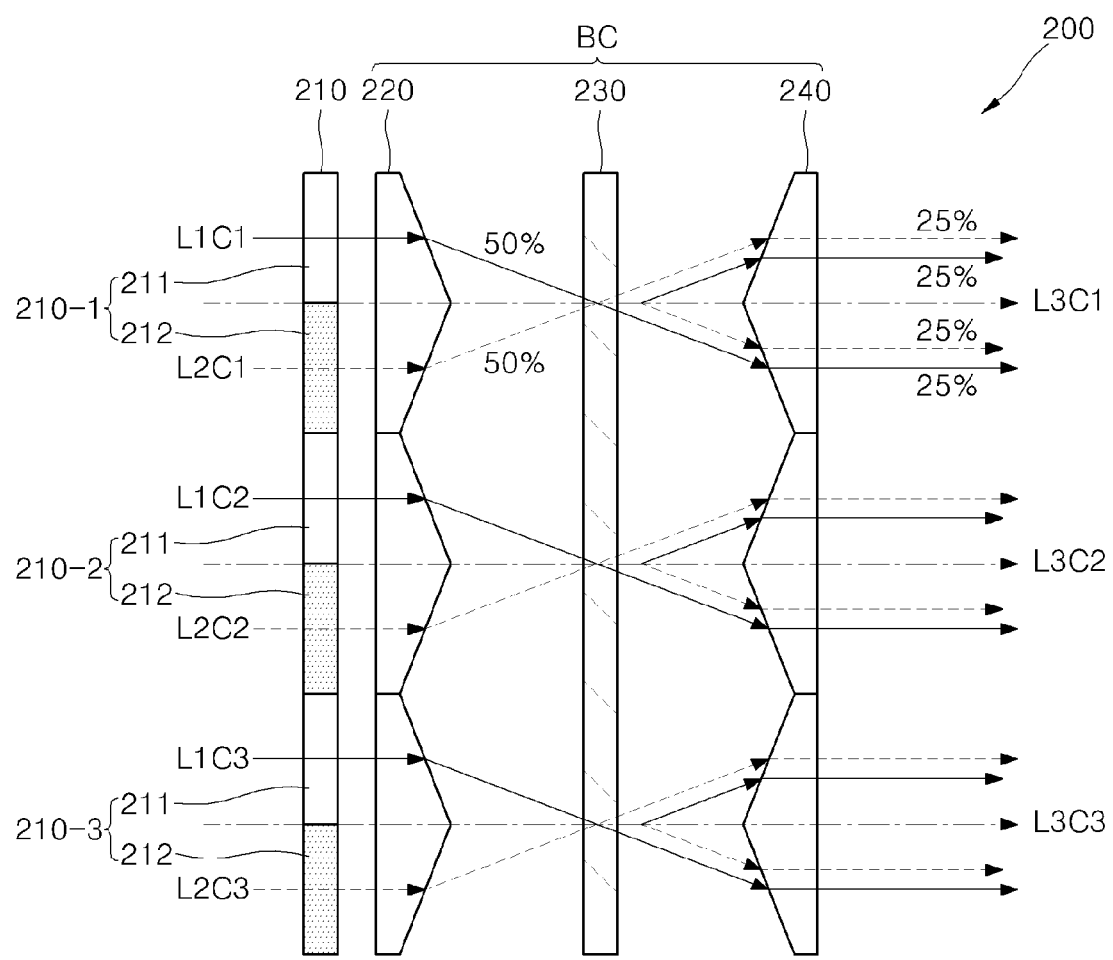
FIG. 4 illustrates an example of displaying a color image by using a spatial division method, which is performed by a complex spatial light modulator, according to another exemplary embodiment.

FIG. 4 illustrates a complex spatial light modulator 200, according to another exemplary embodiment. The complex spatial light modulator 200 may display a color image by using a plurality of color light beams.

The complex spatial light modulator 200 may include a spatial light modulator 210 for modulating a phase of a beam, and a beam combiner BC for combining the beam that is transmitted from the spatial light modulator 210. The beam combiner BC may include a first prism array 220, a hologram optical device 230, and a second prism array 240.

The first prism array 220 and the second prism array 240 may be disposed to be symmetric with respect to the hologram optical device 230. The first prism array 220 and the second prism array 240 are substantially identical to the first prism array 20 and the second prism array 40 which are described with reference to FIG. 2. Thus, a detailed description thereof will not be provided here.

The hologram optical device 230 may include a plurality of hologram patterns that depend on a wavelength of light. For example, the hologram optical device 230 may include a first hologram pattern for diffracting light of a first wavelength, a second hologram pattern for diffracting light of a second wavelength, and a third hologram pattern for diffracting light of a third wavelength. For example, light of the first wavelength may be red-wavelength light, light of the second wavelength may be green-wavelength light, and light of the third wavelength may be blue-wavelength light.

The spatial light modulator 210 may include, for example, a first pixel set 210-1 for light of the first wavelength, a second pixel set 210-2 for light of the second wavelength, and a third pixel set 210-3 for light of the third wavelength. Additionally, the first through third pixel sets 210-1 through 210-3 may respectively include the first pixel 211 and the second pixel 212. First light L1C1 of the first wavelength may be incident on the first pixel 211 of the first pixel set 210-1, and second light L2C1 of the first wavelength may be incident on the second pixel 212 of the first pixel set 210-1. First light L1C2 of the second wavelength may be incident on the first pixel 211 of the second pixel set 210-2, and second light L2C2 of the second wavelength may be incident on the second pixel 212 of the second pixel set 210-2. First light L1C3 of the third wavelength may be incident on the first pixel 211 of the third pixel set 210-3, and second light L2C3 of the third wavelength may be incident on the second pixel 212 of the third pixel set 210-3.

The first light L1C1 and the second light L2C1 of the first wavelength may respectively pass through the first prism array 220, the hologram optical device 230, and the second prism array 240, and then, be combined with each other, thus output as the third light L3C1 of the first wavelength.

The first light L1C1 and the second light L2C1 of the second wavelength may respectively pass through the first prism array 220, the hologram optical device 230, and the second prism array 240, and then, be combined with each other, thus output as the third light L3C2 of the second wavelength.

The first light L1C3 and the second light L2C3 of the third wavelength may respectively pass through the first prism array 220, the hologram optical device 230, and the second prism array 240, and then, be combined with each other, thus output as the third light L3C3 of the third wavelength.

The hologram optical device 230 may respectively diffract light of the first wavelength, light of the second wavelength, and light of the third wavelength. For example, the third light L3C1 of the first wavelength, the third light L3C2 of the second wavelength, and the third light L3C3 of the third wavelength may respectively have light efficiency of approximately 100% with regard to incident light.

In FIG. 4, a color image may be displayed by using a spatial division method in which each color light is spatially divided and simultaneously employed. Additionally, in the current exemplary embodiment, the complex spatial light modulator 200 may improve light efficiency, and thus, power consumption may be reduced.

Figure 5:
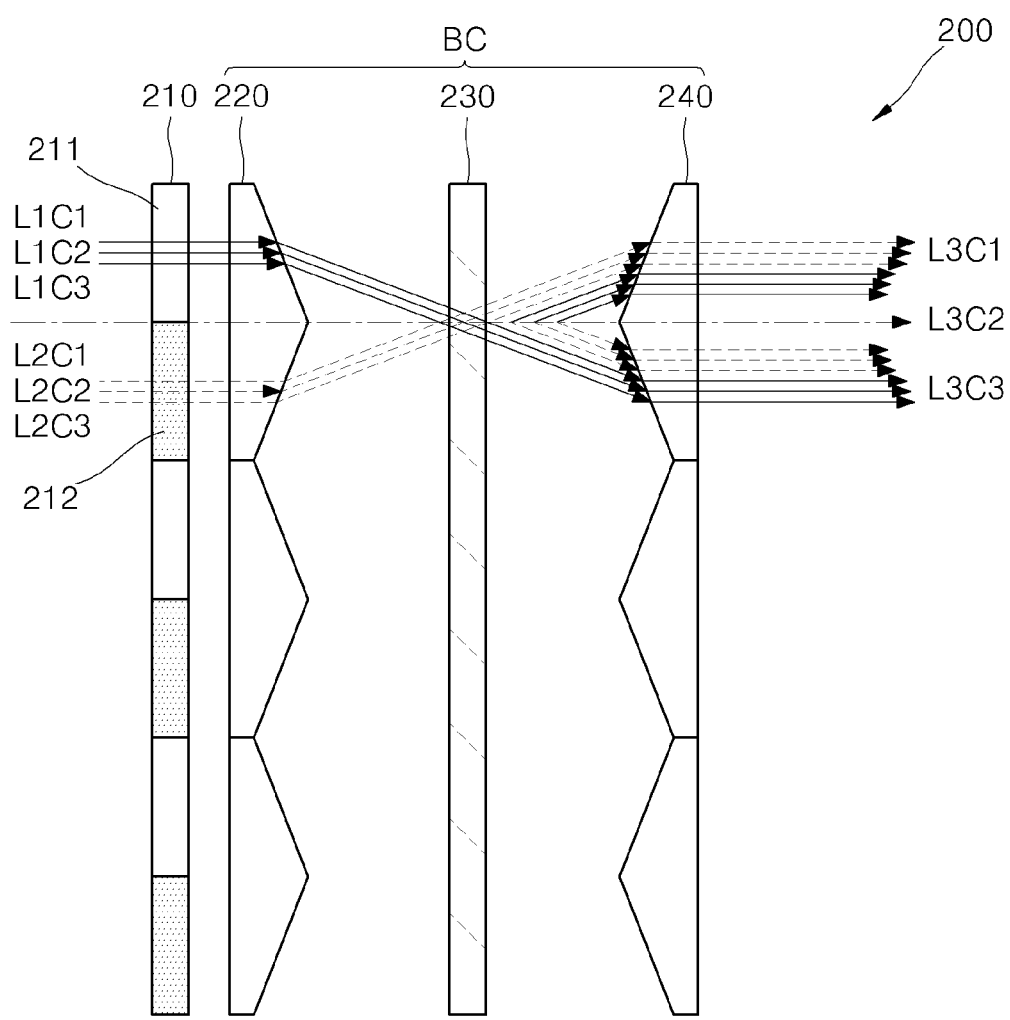
FIG. 5 illustrates an example of displaying a color image by using a time division method, which is performed by the complex spatial light modulator of FIG. 4.

FIG. 5 illustrates an example of displaying a color image by using a time division method in which each color light is time-divided and sequentially used. For example, at a point of time of t=t1, first light L1C1 of the first wavelength may be incident on the first pixel 211 of the first pixel set 210-1, and second light L2C1 of the first wavelength may be incident on the second pixel 212 of the first pixel set 210-1. The first light L1C1 and the second light L2C1 of the first wavelength may pass through the first prism array 220, the hologram optical device 230, and the second prism array 240, and then, be combined with each other, thus output as third light L3C1 of the first wavelength. Light may also progress in the same way with regard to the second and third pixel sets 210-2 and 210-3.

At a point of time of t=t2, first light L1C2 of the second wavelength may be incident on the first pixel 211 of the first pixel set 210-1, and second light L2C2 of the second wavelength may be incident on the second pixel 212 of the first pixel set 210-1. The first light L1C2 and the second light L2C2 of the second wavelength may pass through the first prism array 220, the hologram optical device 230, and the second prism array 240, and then, be combined with each other, thus output as the third light L3C2 of the second wavelength.

At a point of time of t=t3, first light L1C3 of the third wavelength may be incident on the first pixel 211 of the first pixel set 210-1, and second light L2C3 of the third wavelength may be incident on the second pixel 212 of the first pixel set 210-1. The first light L1C3 and the second light L2C3 of the third wavelength may pass through the first prism array 220, the hologram optical device 230, and the second prism array 240, and then, be combined with each other, thus output as third light L3C3 of the third wavelength. In the case of displaying color by using the time-division method, a resolution may be improved compared to the spatial division method.

Figure 6:
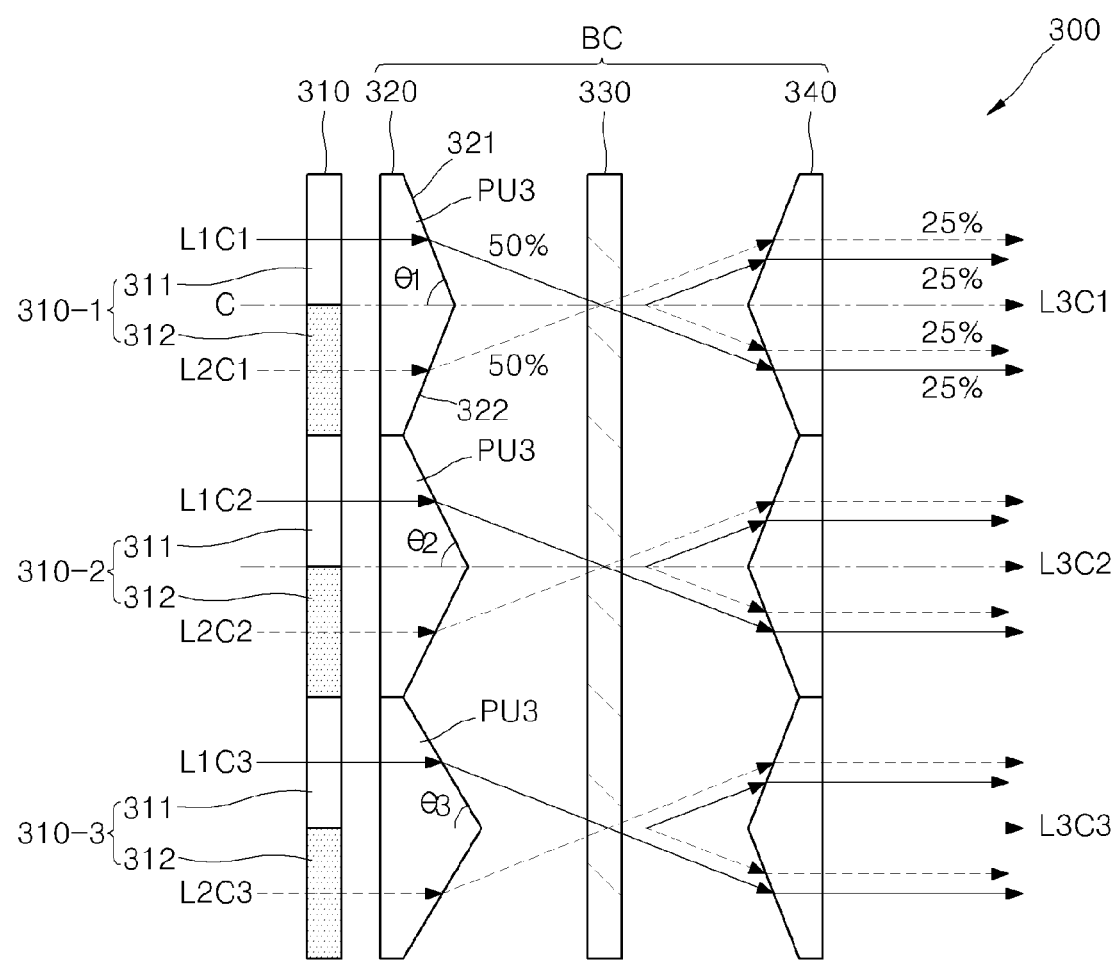
FIG. 6 is a diagram of a complex spatial light modulator according to another exemplary embodiment.

FIG. 6 illustrates an example of displaying a color image color by using a spatial division method.

A complex spatial light modulator 300, shown in FIG. 6, may include a spatial light modulator 310 for modulating a phase of a beam, and a beam combiner BC for combining the beam that is transmitted from the spatial light modulator 310. The beam combiner BC may include a first prism array 320, a hologram optical device 330, and a second prism array 340.

The spatial light modulator 310 may include, for example, a first pixel set 310-1 for light of a first wavelength, a second pixel set 310-2 for light of a second wavelength, and a third pixel set 310-3 for light of a third wavelength. Additionally, the first through third pixels sets 310-1 through 310-3 may respectively include the first pixel 311 and the second pixel 312. First light L1C1 of the first wavelength may be incident on the first pixel 311 of the first pixel set 310-1, and second light L2C1 of the first wavelength may be incident on the second pixel 312 of the first pixel set 310-1. First light L1C2 of the second wavelength may be incident on the first pixel 311 of the second pixel set 310-2, and second light L2C2 of the second wavelength may be incident on the second pixel 312 of the second pixel set 310-2. First light L1C3 of the third wavelength may be incident on the first pixel 311 of the third pixel set 310-3, and second light L2C3 of the third wavelength may be incident on the second pixel 312 of the third pixel set 310-3.

The first prism array 320 may include a first prism unit PU1 that corresponds to the first pixel set 310-1, a second prism unit PU2 that corresponds to the second pixel set 310-2, and a third prism unit PU3 that corresponds to the third pixel set 310-3.

The first prism unit PU1, the second prism unit PU2, and the third prism unit PU3 may have first and second prism surfaces 321 and 322 which respectively have different prism angles. A prism angle represents an inclination of a prism surface against a central axis C of a prism unit. Prism angles of the first and second prism 321 and 322 may be identical to each other. For example, if a first prism angle of the first prism unit PU1 is assumed as $\theta 1$, a second prism angle of the second prism unit PU2 is assumed as $\theta 2$, and a third prism angle of the third prism unit PU3 is assumed as $\theta 3$, the first prism array 320 may be configured to satisfy a following equation.

$$\theta 1 > \theta 2 > \theta 3 \qquad \text{<Equation 1>}$$

However, a structure of the first prism array is not limited to being obtained by using Equation 1, and may be variously modified. The first through third prism angles may be formed to have different sizes according to a wavelength of each light. The first prism array 320 may have a structure in which the first through third prism units PU1 through PU3 are repeatedly arranged.

Since the first through third prism units PU1 through PU3 respectively have different prism angles, light of the first wavelength, light of the second wavelength, and light of the third wavelength may be incident on the hologram optical device 330 with different angles from each other. The hologram optical device 300 may be designed to have different diffraction characteristics according to an incident angle of light. Accordingly, the hologram optical device 300 may display diffraction characteristics, which respectively correspond to first wavelength light, second wavelength light, and third wavelength light, respectively having different wavelengths.

The second prism array 340 may have a structure that is symmetric to the first prism array 320 with respect to the hologram optical device 330. Light that passes through the hologram optical device 300 by using the second prism array 340 may become parallel to each other, and thus, light efficiency may be improved.

The first light L1C1 and the second light L2C1 of the first wavelength may respectively pass through the first prism unit PU1 of the first prism array 220, the hologram optical device 330, and the second prism array 340, and then, be combined with each other, thus output as the third light L3C1 of the first wavelength.

The first light L1C2 and the second light L2C2 having the second wavelength may respectively pass through the second prism unit PU2 of the first prism array 320, the hologram optical device 330, and the second prism array 340, and then, be combined with each other, thus output as the third light L3C2 of the second wavelength.

The first light L1C3 and the second light L2C3 having the third wavelength may respectively pass through the third prism unit PU3 of the first prism array 320, the hologram optical device 330, and the second prism array 340, and then, be combined with each other, thus output as the third light L3C3 of the third wavelength.

The hologram optical device 330 may respectively diffract light of the first wavelength, light of the second wavelength, and light of the third wavelength at the same time. For example, the third light L3C1 of the first wavelength, the third light L3C2 of the second wavelength, and the third light L3C3 of the third wavelength may respectively have light efficiency of approximately 100% with regard to incident light.

Figure 7:
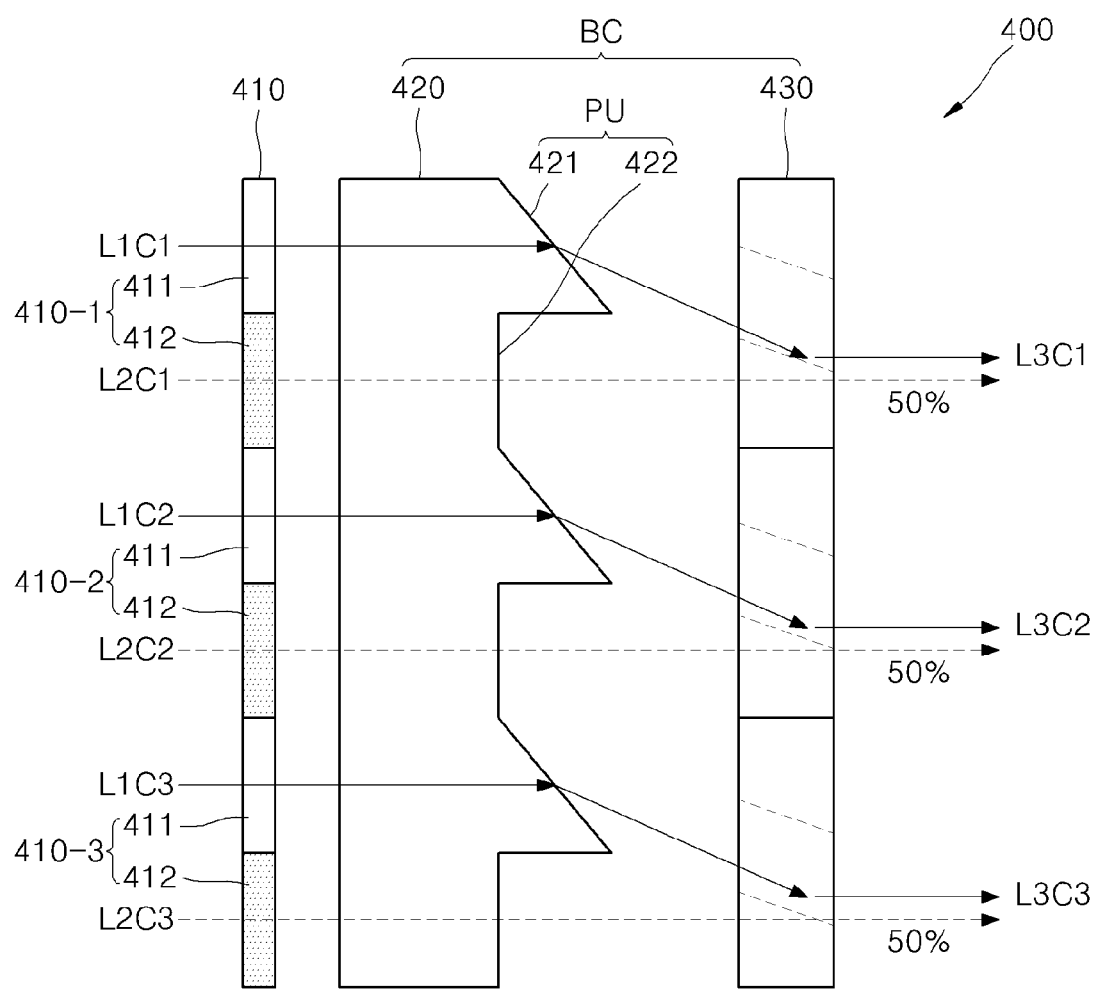
FIG. 7 illustrates an example of displaying a color image by using a spatial division method, which is performed by a complex spatial light modulator, according to another exemplary embodiment.

FIG. 7 illustrates a complex spatial light modulator 400 for displaying a plurality of color light by using a spatial division method. The complex spatial light modulator 400 may include a spatial light modulator 410 for modulating a phase of a beam, and a beam combiner BC for combining the beam that is transmitted from the spatial light modulator 410. The beam combiner BC may include a prism array 420 and a hologram optical device 430.

The prism array 420 includes a plurality of prism units PU. The prism unit PU may include a first prism surface 421 for diffracting incident light and a second prism surface 422 for transmitting incident light. For example, the first prism surface 421 may have an inclined surface, and the second prism surface 422 may have a surface perpendicular to an optical axis.

The hologram optical device 430 may include a plurality of hologram patterns that depend on a wavelength of light. For example, the hologram optical device 430 may include a first hologram pattern for diffracting light of a first wavelength, a second hologram pattern for diffracting light of a second wavelength, and a third hologram pattern for diffracting a light of a third wavelength. For example, light of the first wavelength may be red-wavelength light, light of the second wavelength may be green-wavelength light, and light of the third wavelength may be blue-wavelength light.

The spatial light modulator 410 may include, for example, a first pixel set 410-1 for light of the first wavelength, a second pixel set 410-2 for light of the second wavelength, and a third pixel set 410-3 for light of the third wavelength. Additionally, first through third pixels sets 410-1 through 410-3 may respectively include the first pixel 411 and the second pixel 412. First light L1C1 of the first wavelength may be incident on the first pixel 411 of the first pixel set 410-1, and second light L2C1 of the first wavelength may be incident on the second pixel 412 of the first pixel set 410-1. First light L1C2 of the second wavelength may be incident on the first pixel 411 of the second pixel set 410-2, and second light L2C2 of the second wavelength may be incident on the second pixel 412 of the second pixel set 410-2. First light L1C3 of the third wavelength may be incident on the first pixel 411 of the third pixel set 410-3, and second light L2C3 of the third wavelength may be incident on the second pixel 412 of the third pixel set 410-3.

The first light L1C1 and the second light L2C1 of the first wavelength may respectively pass through the prism array 420 and the hologram optical device 430, and then, be combined with each other, thus output as the third light L3C1 of the first wavelength.

The first light L1C2 and the second light L2C2 of the second wavelength may respectively pass through the prism array 420 and the hologram optical device 430, and then, be combined with each other, thus outputting as third light L3C2 of the second wavelength.

The first light L1C3 and the second light L2C3 of the third wavelength may respectively pass through the prism array 420 and the hologram optical device 230, and then, be combined with each other, thus output as third light L3C3 of the third wavelength.

The hologram optical device 430 may respectively diffract light of the first wavelength, light of the second wavelength, and light of the third wavelength at the same time. For example, the third light L3C1 of the first wavelength, the third light L3C2 of the second wavelength, and the third light L3C3 of the first wavelength may respectively have light efficiency of approximately 50% with regard to incident light. However, light efficiency of 50% is only an example, and light efficiency may be variously modified according to a design of a hologram optical device.

Figure 8:
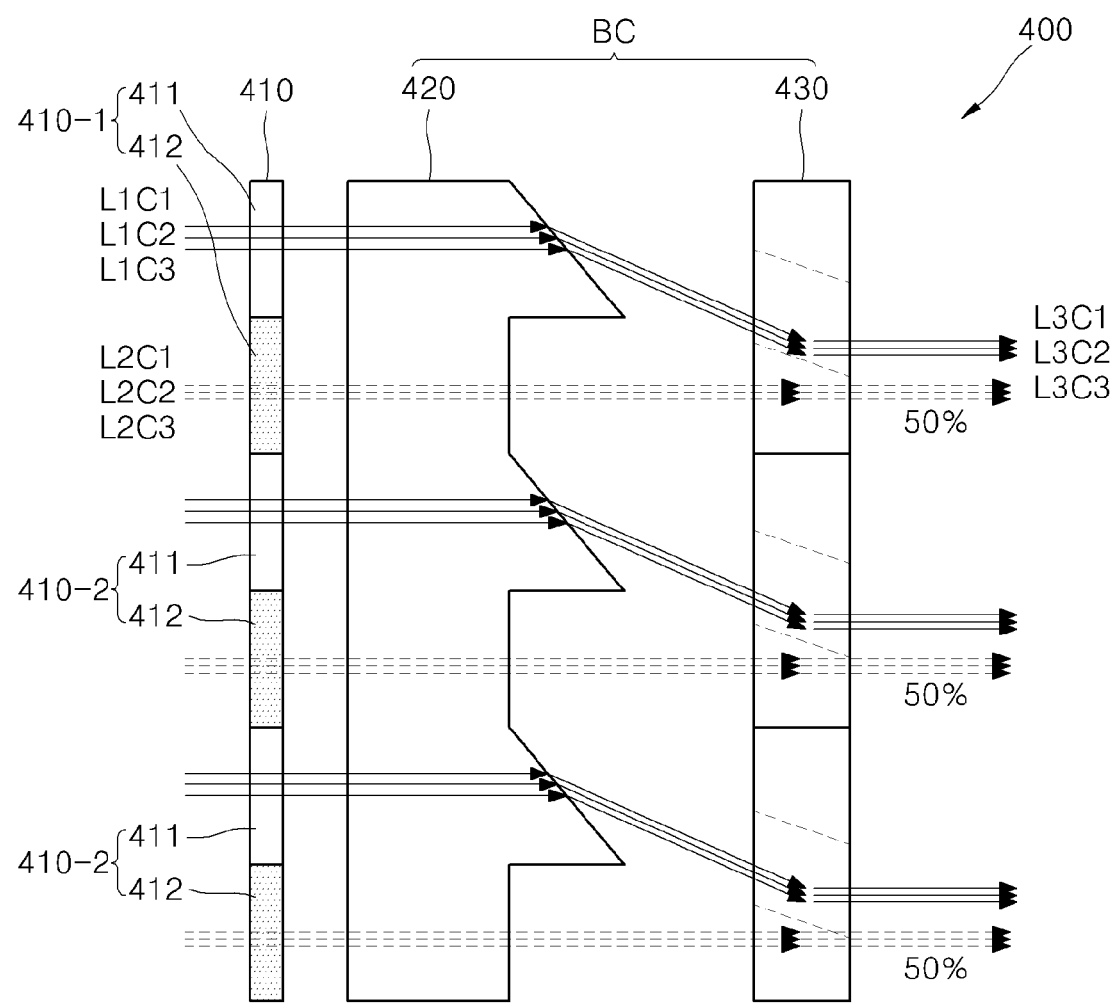
FIG. 8 illustrates an example of displaying a color image by using a time division method, which is performed by the complex spatial light modulator of FIG. 7.

FIG. 8 illustrates an example of displaying a color image by using a time division method in which color light is time-divided and sequentially used, which is performed by the complex spatial light modulator 400. For example, at a point of time of t=t1, the first light L1C1 of the first wavelength may be incident on the first pixel 411 of the first pixel set 410-1, and the second light L2C1 of the first wavelength may be incident on the second pixel 412 of the first pixel set 410-1. The first light L1C1 and the second light L2C1 of the first wavelength may pass through the prism array 420 and the hologram optical device 430, and then, be combined with each other, thus output as third light L3C1 of the first wavelength. Light may also progress in the same way with regard to the second and third pixel sets 410-2 and 410-3.

At a point of time of t=t2, the first light L1C2 of the second wavelength may be incident on the first pixel 411 of the first pixel set 410-1, and the second light L2C2 of the second wavelength may be incident on the second pixel 412 of the first pixel set 410-1. The first light L1C2 and the second light L2C2 of the second wavelength may pass through the prism array 420 and the hologram optical device 430, and then, be combined with each other, thus output as the third light L3C2 of the second wavelength.

At a point of time of t=t3, first light L1C3 of the third wavelength may be incident on the first pixel 411 of the first pixel set 410-1, and second light L2C3 of the third wavelength may be incident on the second pixel 412 of the first pixel set 410-1. The first light L1C3 and the second light L2C3 of the third wavelength may pass through the prism array 420 and the hologram optical device 430, and then, be combined with each other, thus output as third light L3C3 of the third wavelength. In the case of displaying color by using a time-division method, a resolution may be improved compared to using a spatial division method.

Figure 9:
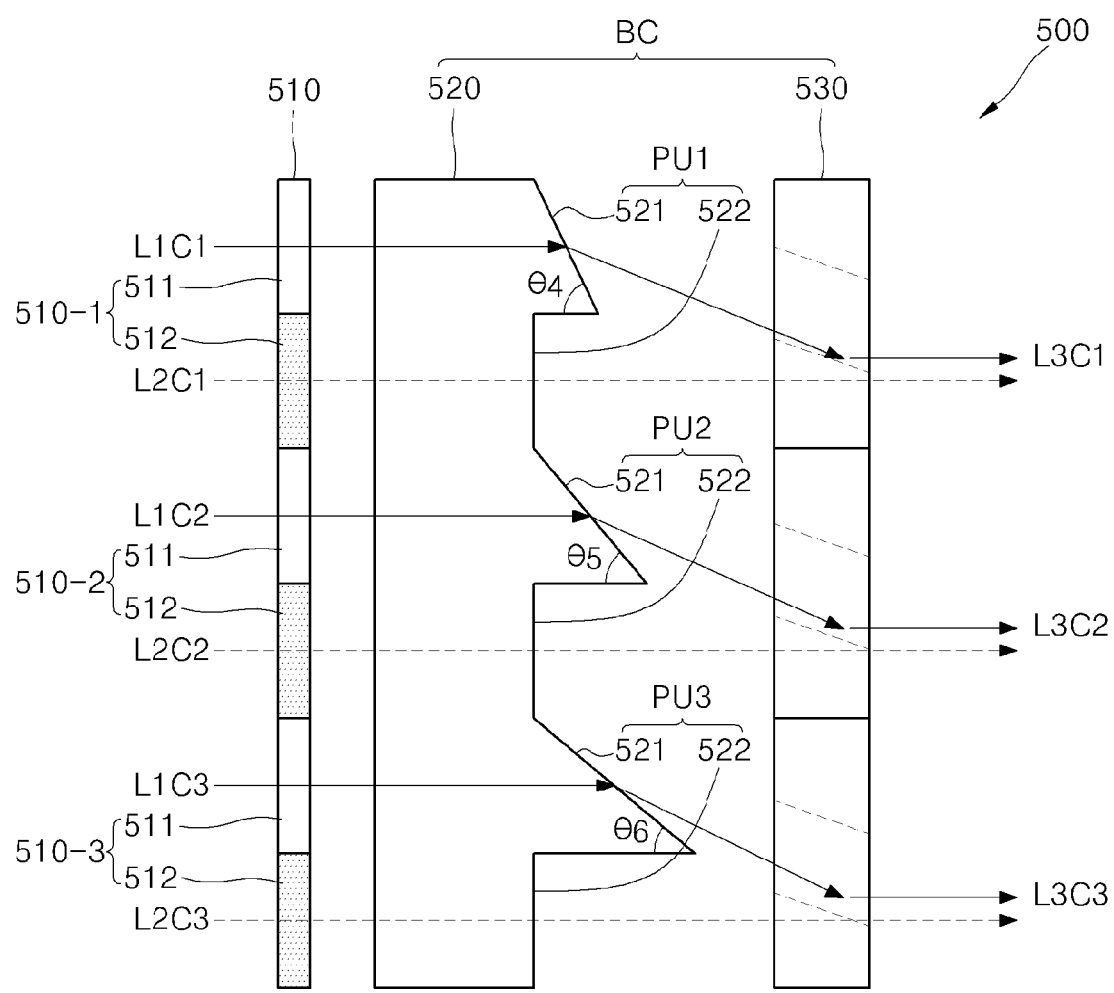
FIG. 9 is a diagram of a complex spatial light modulator according to another exemplary embodiment.

FIG. 9 illustrates another example of displaying a color image by using a spatial division method.

A complex spatial light modulator 500, shown in FIG. 9, may include a spatial light modulator 510 for modulating both a phase of a beam, and a beam combiner BC for combining the beam that is transmitted from the spatial light modulator 510. The beam combiner BC may include a prism array 520 and a hologram optical device 530.

The spatial light modulator 510 may include, for example, a first pixel set 510-1 for light of a first wavelength, a second pixel set 510-2 for light of a second wavelength, and a third pixel set 510-3 for light of a third wavelength. Additionally, the first through third pixels sets 510-1 through 510-3 may respectively include the first pixel 511 and the second pixel 512. First light L1C1 of the first wavelength may be incident on the first pixel 511 of the first pixel set 510-1, and second light L2C1 of the first wavelength may be incident on the second pixel 512 of the first pixel set 510-1. First light L1C2 of the second wavelength may be incident on the first pixel 511 of the second pixel set 510-2, and second light L2C2 of the second wavelength may be incident on the second pixel 512 of the second pixel set 510-2. First light L1C3 of the third wavelength may be incident on the first pixel 511 of the third pixel set 510-3, and second light L2C3 of the third wavelength may be incident on the second pixel 512 of the third pixel set 310-3.

The first prism array 520 may include a first prism unit PU1 that corresponds to the first pixel set 510-1, a second prism unit PU2 that corresponds to the second pixel set 510-2, and a third prism unit PU3 that corresponds to the third pixel set 510-3.

The first prism unit PU1, the second prism unit PU2, and the third prism unit PU3 may respectively have a first prism surface 521 for refracting incident light and a second prism surface 522 for transmitting incident light. For example, the first prism surface 521 may have an inclination surface, and the second prism surface 522 may have a surface perpendicular to an optical axis.

The first prism unit PU1, the second prism unit PU2, and the third prism unit PU3 may respectively have first surfaces 521 each having a different prism angle. A prism angle represents an inclination of a prism surface against an optical axis or a central axis of a prism unit. For example, if a first prism angle of the first prism surface 521 of the first prism unit PU1 is assumed to be $\theta 4$, a second prism angle of the first prism surface 521 of the second prism unit PU2 is assumed to be $\theta 5$, and a third prism angle of the first prism surface 521 of the third prism unit PU3 is assumed to be $\theta 6$, the first prism array 520 may be configured to satisfy a following equation:

$$\theta 4 > \theta 5 > \theta 6 \qquad \text{<Equation 2>}$$

However, a structure of a prism array is not limited to being obtained by using Equation 2, and may be variously modified. The first through third prisms may have different angles according to a wavelength of each light. The prism array 520 may have a structure in which the first through third prism units PU1 through PU3 are repeatedly arranged.

Since the first through third prism units PU1 through PU3 respectively have a different prism angle, light of the first wavelength, light of the second wavelength, and light of the third wavelength may be incident on the hologram optical device 530 respectively with a different angle from each other. The hologram optical device 530 may be designed to have different diffraction characteristics according to an incident angle of light. Accordingly, the hologram optical device 530 may display diffraction characteristics, which respectively correspond to light of the first wavelength, light of the second wavelength, and light of the third wavelength that have a different wavelength from each other.

The first light L1C1 and the second light L2C1 of the first wavelength may respectively pass through the first prism unit PU1 of the prism array 520 and the hologram optical device 530, and then, be combined with each other, thus output as third light L3C1 of the first wavelength.

The first light L1C2 and the second light L2C2 of the second wavelength may respectively pass through the second prism unit PU2 of the prism array 520 and the hologram optical device 530, and then, be combined with each other, thus output as third light L3C2 of the second wavelength.

The first light L1C3 and the second light L2C3 of the third wavelength may respectively pass through the third prism unit PU3 of the prism array 520 and the hologram optical device 530, and then, be combined with each other, thus output as third light L3C3 of the third wavelength.

As described above, according to exemplary embodiments, a complex spatial light modulator may display various color images by employing a time-division method or a spatial division method.

According to exemplary embodiments, a complex spatial light modulator may be applied to a holographic three-dimensional (3D) image display apparatus so as to display a 3D image.

Figure 10:
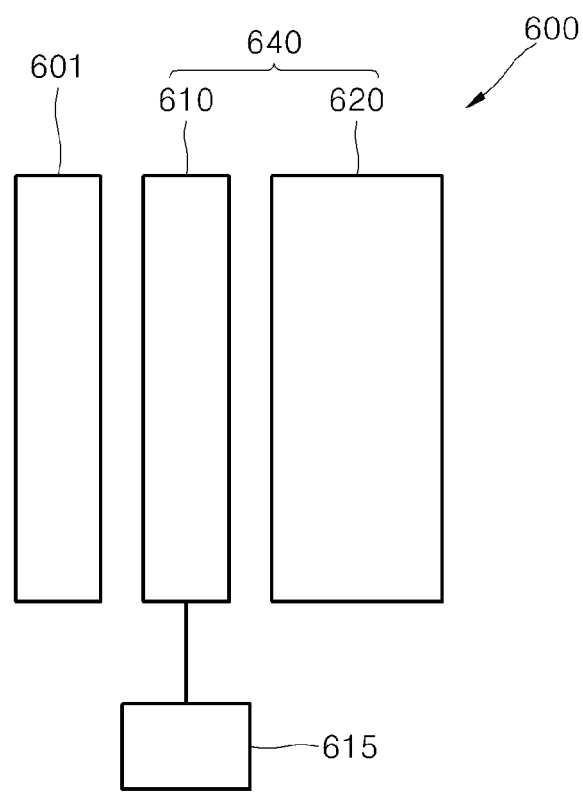
FIG. 10 is a schematic diagram of a three-dimensional (3D) image display apparatus, according to an exemplary embodiment.

FIG. 10 is a schematic diagram of a 3D image display apparatus 600, according to an exemplary embodiment.

The 3D image display apparatus 600 may include a light source unit 601 (e.g., light source), and a complex spatial light modulator 640 for displaying a 3D image by using light generated from the light source unit 601. The complex spatial light modulator 640 may include a spatial light modulator 610 for modulating a phase of a beam, and a beam combiner 620 for combining a beam that is transmitted from the spatial light modulator 610, and thus, modulating a phase and an amplitude of the light. The spatial light modulator 610 may include an image signal circuit unit 615 (e.g., image signal circuit) for inputting a holographic image signal. One complex spatial light modulator, from among those described with reference to FIG. 1 through 9, may be employed as the complex spatial light modulator 640. The complex spatial light modulator 640 may be manufactured to be slim and applied to a flat-panel holographic 3D image display apparatus, and thus, provide a high quality 3D image. Additionally, the complex spatial light modulator 640 displays a 3D image by using a hologram optical device that does not depend on polarizing characteristics of light. Thus, light efficiency may be improved, and accordingly, power consumption may be reduced.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the exemplary embodiments as defined by the following claims.

What is claimed is:

1. A complex spatial light modulator comprising:
a spatial light modulator configured to modulate a phase of light;
a first prism array which is disposed after the spatial light modulator along a path of the light, and comprising prism units each consisting of a first prism surface and a second prism surface; and
a hologram optical device configured to diffract the light independently from a polarization of the light,
wherein the first prism array and the hologram optical device are configured to modulate the phase and an amplitude of the light, and wherein the spatial light modulator comprises a plurality of pixels, each prism unit faces only two pixels among the plurality of pixels, and the hologram optical device combines first light and second light from the two pixels, respectively, such that a phase and an amplitude of the combined light are modulated together.

2. The complex spatial light modulator of claim 1, wherein the first prism surface and the second prism surface respectively comprise a refraction surface configured to refract the light, and the first prism surface and the second prism surface are arranged to be symmetric to each other.

3. The complex spatial light modulator of claim 2, further comprising a second prism array disposed after the hologram optical device along the path of the light.

4. The complex spatial light modulator of claim 3, wherein the second prism array has a structure that is symmetric to the first prism array with respect to the hologram optical device.

5. The complex spatial light modulator of claim 1, wherein the first prism surface comprises a diffraction surface configured to diffract the light, and the second prism surface comprises a transmission surface configured to transmit the light in a straight line.

6. The complex spatial light modulator of claim 1, wherein the hologram optical device comprises a plurality of hologram patterns that depend on a wavelength of incident light.

7. The complex spatial light modulator of claim 6, wherein the complex spatial light modulator is configured to modulate color light by using a time-division method or a spatial division method.

8. The complex spatial light modulator of claim 1, wherein the first prism array comprises a first prism unit, a second prism unit, and a third prism unit, each having different prism angles from each other.

9. The complex spatial light modulator of claim 1, wherein the prism unit has a pitch that corresponds to the two pixels.

10. The complex spatial light modulator of claim 1, wherein the complex spatial light modulator has light efficiency equal to or higher than 50% and equal to or less than 100%.

11. The complex spatial light modulator of claim 1, wherein the complex spatial light modulator comprises an electro-opto material having a refractive index configured to change according to an electrical signal.

12. A three-dimensional (3D) image display apparatus comprising:
   a light source configured to irradiate light;
   a spatial light modulator configured to modulate a phase of the light from the light source;
   an image signal circuit configured to input an image signal to the spatial light modulator; and
   a beam combiner configured to modulate a phase and an amplitude of the light after the light passes through the spatial light modulator,
   wherein the beam combiner is disposed after the spatial light modulator along a path of the light, and
   the 3D image display apparatus comprises:
     a first prism array comprising prism units each consisting of a first prism surface and a second prism surface, and
     a hologram optical device configured to diffract the light independently from a polarization of the light,
   wherein the spatial light modulator comprises a plurality of pixels, each prism unit faces only two pixels among the plurality of pixels, and the hologram optical device combines first light and second light from the two pixels, respectively, such that a phase and an amplitude of the combined light are modulated together.

13. The 3D image display apparatus of claim 12, wherein the first prism surface and the second prism surface respectively comprise a refraction surface configured to refract the light, and the first prism surface and the second prism surface are arranged to be symmetric to each other.

14. The 3D image display apparatus of claim 13, further comprising a second prism array provided after the hologram optical device along the path of the light.

15. The 3D image display apparatus of claim 14, wherein the second prism array has a structure that is symmetric to the first prism array with respect to the hologram optical device.

16. The 3D image display apparatus of claim 12, wherein the first prism surface comprises a diffraction surface configured to diffract the light, and the second prism surface comprises a transmission surface configured to transmit the light in a straight line.

17. The 3D image display apparatus of claim 12, wherein the hologram optical device comprises a plurality of hologram patterns that depend on a wavelength of incident light.

18. The 3D image display apparatus of claim 17, wherein the complex spatial light modulator is configured to modulate color light by using a time-division method or a spatial division method.

19. The 3D image display apparatus of claim 12, wherein the prism array comprises a first prism unit, a second prism unit, and a third prism unit, each having different prism angles from each other.

20. The 3D image display apparatus of claim 12, wherein the prism unit has a pitch that correspond to the two pixels.

21. The 3D image display apparatus of claim 12, wherein the complex spatial light modulator has a light efficiency in a range equal to or higher than 50% and equal to or less than 100%.

22. The 3D image display apparatus of claim 12, wherein the complex spatial light modulator comprises an electro-opto material having a refractive index configured to change according to an electrical signal.

\* \* \* \* \*